(12) United States Patent
Sun et al.

(10) Patent No.: US 12,434,223 B2
(45) Date of Patent: Oct. 7, 2025

(54) ZEARALENONE FUNCTIONALIZED GRAPHENE SURFACE MOLECULARLY IMPRINTED MATERIAL, PREPARATION METHOD THEREFOR AND USE THEREOF

(71) Applicant: ACADEMY OF NATIONAL FOOD AND STRATEGIC RESERVES ADMINISTRATION, Beijing (CN)

(72) Inventors: Changpo Sun, Beijing (CN); Yangying Han, Beijing (CN); Hujun Liu, Beijing (CN); Jun Wang, Beijing (CN); Xiaojiao Chang, Beijing (CN); Jing Sun, Beijing (CN)

(73) Assignee: Academy of National Food and Strategic Reserves Administration, Beijing (CN)

( * ) Notice: Subject to any disclaimer, the term of this patent is extended or adjusted under 35 U.S.C. 154(b) by 483 days.

(21) Appl. No.: 17/927,384

(22) PCT Filed: Jul. 1, 2021

(86) PCT No.: PCT/CN2021/104035
§ 371 (c)(1),
(2) Date: Nov. 23, 2022

(87) PCT Pub. No.: WO2022/007704
PCT Pub. Date: Jan. 13, 2022

(65) Prior Publication Data
US 2023/0234029 A1    Jul. 27, 2023

(30) Foreign Application Priority Data

Jul. 6, 2020  (CN) .......................... 202010641137.0
Jul. 6, 2020  (CN) .......................... 202010641149.3

(51) Int. Cl.
*B01J 20/26*     (2006.01)
*B01D 15/18*    (2006.01)
(Continued)

(52) U.S. Cl.
CPC ........ *B01J 20/268* (2013.01); *B01D 15/1807* (2013.01); *B01D 15/206* (2013.01);
(Continued)

(58) Field of Classification Search
CPC ...... B01J 20/268; B01J 20/103; B01J 20/205; B01J 20/28019; B01J 20/289;
(Continued)

(56) References Cited

FOREIGN PATENT DOCUMENTS

| CN | 101745370 A | 6/2010 |
|---|---|---|
| CN | 102335593 A | 2/2012 |

(Continued)

OTHER PUBLICATIONS

Guo, J., et al., "Progress on preparation and application of molecularly imprinted membrane", Applied Chemical Industry 47 (8), 5 pages (2018). [English Abstract].
(Continued)

*Primary Examiner* — James A Fiorito
(74) *Attorney, Agent, or Firm* — Viksnins Harris Padys Malen LLP (57) ABSTRACT

A zearalenone functionalized graphene surface molecularly imprinted material, a preparation method therefor and the use thereof, which belong to the technical field of molecularly imprinted materials. The zearalenone functionalized graphene surface molecularly imprinted material is prepared by using RGO as a carrier, CDHB as a template molecule, 1-ALPP as a functional monomer, TRIM as a cross-linking agent, AIBN as an initiator, and acetonitrile as a pore-forming agent.

6 Claims, 3 Drawing Sheets

(51) Int. Cl.
*B01D 15/20* (2006.01)
*B01J 20/10* (2006.01)
*B01J 20/20* (2006.01)
*B01J 20/28* (2006.01)
*B01J 20/289* (2006.01)
*B01J 20/30* (2006.01)
*B01J 20/32* (2006.01)

(52) U.S. Cl.
CPC .......... *B01J 20/103* (2013.01); *B01J 20/205* (2013.01); *B01J 20/28019* (2013.01); *B01J 20/289* (2013.01); *B01J 20/3021* (2013.01); *B01J 20/3092* (2013.01); *B01J 20/3204* (2013.01); *B01J 20/3219* (2013.01); *B01J 20/3278* (2013.01); *B01J 2220/54* (2013.01)

(58) Field of Classification Search
CPC ................ B01J 20/3021; B01J 20/3092; B01J 20/3219; B01J 20/3278; B01D 15/1807; B01D 15/206
See application file for complete search history.

(56) References Cited

FOREIGN PATENT DOCUMENTS

| | | |
|---|---|---|
| CN | 102633939 A | 8/2012 |
| CN | 104374815 A | 2/2015 |
| CN | 105688444 A | 6/2016 |
| CN | 105693909 A | 6/2016 |
| CN | 108456277 A | 8/2018 |
| CN | 111013654 A | 4/2020 |
| CN | 111905701 A | 11/2020 |
| CN | 111909311 A | 11/2020 |

OTHER PUBLICATIONS

Patent Cooperation Treaty, International Search Report for PCT/CN2021/104035, 6 pages dated Sep. 27, 2021.

Urraca, J, et al., "Molecularly imprinted polymers with a streamlined mimic for zearalenone analysis", Journal of Chromatography A, 1116, 127-134 (2006).

ZEARALENONE FUNCTIONALIZED GRAPHENE SURFACE MOLECULARLY IMPRINTED MATERIAL, PREPARATION METHOD THEREFOR AND USE THEREOF

CROSS-REFERENCE TO RELATED APPLICATIONS

This application claims priority to Chinese Patent Application No. 202010641149.3 filed on Jul. 6, 2020, and Chinese Patent Application No. 202010641137.0, filed on Jul. 6, 2020, with the China National Intellectual Property Administration (CNIPA).

TECHNICAL FIELD

Embodiments in the present disclosure relate to the technical field of molecularly imprinted materials, in particular to a zearalenone functionalized graphene surface molecularly imprinted material, a preparation method therefor and use thereof.

BACKGROUND

Zearalenone (ZEN) is one of the most widely distributed fusarium in the world and has been found in grain and agricultural by-products from Asia, Europe, America, etc. ZEN is mainly generated in starch-rich grain seeds, enters the food chain through raw materials for feed and food, and accumulates within the human or animal body. It produces estrogen effect syndrome in the body, causes excessive estrogen in animals, has carcinogenicity, and has toxic effects on the kidney and liver of animals.

Currently, the detection methods of ZEN mainly include chromatographic techniques, such as HPLC, GC-MS, LC-MS, etc., which are time-consuming and expensive. Therefore, it has great significance to establish an economical, rapid and sensitive detection method for ZEN.

Molecular imprinting technology refers to the technology that imitating antigen-antibody, enzyme and other biological recognition systems, and chemically synthesizing polymers that have specific binding effects on specific targets owing to spatial structure and binding sites. Using the target analyte (or the structural analog thereof) as a template molecule, a molecularly imprinted polymer is prepared which has a three-dimensional structure with a fixed size of holes and a fixed arrangement of functional groups; when the template molecules are removed, holes are generated in the imprinted polymer, which have similar spatial structure and size to the template molecule, and have binding sites complementary to the template molecules, so as to achieve a high degree of specific recognition of the target molecules.

The preparation process of molecularly imprinted polymers mainly includes three steps, namely pre-assembly, polymerization and template removal. According to the location of recognition sites, the preparation methods of molecularly imprinted polymers mainly include two categories, namely, the embedding method and the surface molecularly imprinting method.

The molecularly imprinted polymer prepared by embedding method has recognition sites mainly distributed inside the polymer, while has few sites distributed on the polymer surface, and there are some problems in the practical applications, such as difficult template molecules removal, large mass transfer resistance inside the imprinted polymer and small effective size. The surface imprinting method refers to the preparation technology of imprinted polymer that a polymerization reaction is carried out on the surface of a specific carrier (or matrix), and the imprinted recognition sites are controlled to distribute on the surface of polymer or carrier (matrix). The imprinted polymer prepared by this technology has a uniform particle size distribution, a morphology which can be controlled by selecting different carriers, a controllable thickness of imprinted polymer, easy template molecules removal and other advantages.

Therefore, it is necessary to establish a molecularly imprinted polymer based on surface molecularly imprinting method to detect ZEN accurately, rapidly and highly sensitively.

SUMMARY

Therefore, an embodiment in the present disclosure provides a zearalenone functionalized graphene surface molecularly imprinted material, a preparation method therefor and use thereof.

In order to achieve the above object, an embodiment in the present disclosure provides a technical solution as follows:

according to a first aspect of the embodiment in the present disclosure, the embodiment in the present disclosure provides a zearalenone functionalized graphene surface molecularly imprinted material, which has reduced graphene oxide (RGO) as a carrier, cyclododecyl 2,4-dihydroxybenzoate (CDHB) as a template molecule, 1-allylpiperazine (1-ALPP) as a functional monomer, trimethylolpropane triacrylate (TRIM) as a cross-linking agent, azodiisobutyronitrile (AIBN) as an initiator, and acetonitrile as a pore-forming agent.

According to a second aspect of an embodiment in the present disclosure, the embodiment in the present disclosure provides a preparation method for the zearalenone functionalized graphene surface molecularly imprinted material described above.

In an embodiment, the method includes the following steps: adding RGO, CDHB, 1-ALPP, TRIM, AIBN and acetonitrile into a solvent in sequence, mixing them uniformly, injecting nitrogen to remove oxygen followed by sealing, and subjecting the mixture to ultraviolet light irradiation for 24 h or 60° C. water bath for constant-temperature reaction for 24 h, so as to obtain a functionalized graphene surface molecularly imprinted polymer; and grinding the functionalized graphene surface molecularly imprinted polymer and sieving it through a 100-200 mesh screen, removing CDHB with an eluent, drying the product at 40° C. overnight, so as to obtain the zearalenone functionalized graphene surface molecularly imprinted material.

In another embodiment, the method includes the following steps:

adding CDHB, 1-ALPP, TRIM, AIBN and acetonitrile into a solvent in sequence, mixing them uniformly, injecting nitrogen to remove oxygen followed by sealing, and subjecting the mixture to ultraviolet light irradiation for 24 h or 60° C. water bath for constant-temperature reaction for 24 h, so as to obtain a molecularly imprinted polymer;

grinding the molecularly imprinted polymer and sieving it through a 100-200 mesh screen, removing CDHB with an eluent, drying the product at 40° C. overnight, so as to obtain a template-removed molecularly imprinted polymer; and subjecting GO and the template-removed molecularly imprinted polymer to a water bath method to obtain the zearalenone functionalized graphene surface molecularly imprinted material.

In the above two methods, preferably, a molar ratio of CDHB:1-ALPP:TRIM is 1:4-8:20.

As an initiator, AIBN is used to initiate thermal polymerization or photopolymerization. Preferably, in an embodiment in the present disclosure, an addition amount of AIBN is 10-20% weight of 1-ALPP.

As a pore-forming agent, acetonitrile is used to result in pores inside the material. With small usage amount of pore-forming agent, the obtained material is hard and difficult to grind, and the adsorption sites on surface cannot be fully exposed, affecting the adsorption effect; with large usage amount of pore-forming agent, the obtained material is soft, and the adsorption sites on material surface are easy to collapse, affecting the adsorption effect as well. Preferably, in an embodiment in the present disclosure, a molar amount to volume ratio of CDHB and acetonitrile is 1 mol:10-30 mL.

With DMF as a solvent, during the polymerization, raw materials can be well dispersed into the solvent above, so as to obtain a uniformly distributed polymer.

An eluent used is a mixture of methanol and acetic acid with a volume ratio of 96:4.

In the "another embodiment" described above, preferably, it includes that dispersing the GO into water or DMF, adding the template-removed molecularly imprinted polymer, subjecting the mixture to ultrasound and mixing it uniformly, then adding hydrazine hydrate, heating the obtained mixture in a 90-95° C. water bath for 4-6 h, cooling the mixture to room temperature, filtering the mixture to obtain powder, then washing the powder with water and ethanol in sequence for a plurality of times, and drying the powder at 60° C. for 1-2 h, so as to obtain the zearalenone functionalized graphene surface molecularly imprinted material.

Preferably, an addition amount of the GO is 0.1-0.5% weight of the template-removed molecularly imprinted polymer, more preferably 0.3%. A concentration of the hydrazine hydrate is 1-10%, and an addition volume to weight ratio of hydrazine hydrate and GO is 1-2 μL:1 mg.

RO and RGO used in the present disclosure are prepared according to the following methods, respectively.

The method for preparing GO in the laboratory, namely the modified Hummers method: graphite powder and sodium nitrate are sequentially added to concentrated sulfuric acid under vigorous stirring at room temperature to form a mixture, and then the mixture is cooled to 0° C. in an ice bath. A temperature of the suspension is controlled below 20° C., potassium permanganate is slowly added to the mixture under vigorous stirring, and the reaction system is transferred to a water bath at 35-40° C. for about half an hour, forming a thick paste. Deionized water is added to the above substances, the obtained new solution is stirred continuously for 15 min followed by slowly adding 30% hydrogen peroxide, and by this time, the solution color changes from brown to yellow. Metal ions in the solution are removed by filtering and washing with 10% HCl aqueous solution, and then the system is washed and centrifuged repeatedly to remove the excess acid. Finally, the obtained solid is dispersed in water, and subjected to ultrasound, centrifugation and dialysis purification to give a homogeneous aqueous solution of GO. In the above process, a weight ratio of graphite powder:sodium nitrate:potassium permanganate=1:0.5:3; a mass percentage of graphite powder in the concentrated sulfuric acid is 5%; and a volume of hydrogen peroxide accounts for 2.5% of the total volume of the solution.

The method for preparing RGO in the laboratory: the homogeneous aqueous solution of GO is added with hydrazine hydrate dropwise (a mass ratio of hydrazine hydrate: GO is 0.008-0.01:1), stirred for 1 h, then transferred to a 50 mL reaction kettle, heated at 180° C. for 12 h, and then cooled to room temperature. The color changes from brown of GO to black of RGO, indicating that GO has been reduced to RGO. The dispersed solution was then centrifuged, and the obtained precipitate is washed with deionized water and ethanol in sequence, and finally the sample is dried at 60° C. overnight to give RGO solid.

CDHB uses the following synthesis steps:

1.6202 g N,N'-carbonyldiimidazole (CDI) and 1.5409 g 2,4-dihydroxybenzoic acid are accurately weighted out and put into a 250 mL round bottom flask, dissolved by adding 20 mL anhydrous N,N-dimethylformamide (DMF), magnetically stirred in a water bath at 40° C. for 1 h, then added with 2.2108 g of cyclododecanol and 1.8214 g of 1,8-diazabicyclo[5.4.0]undec-7-ene (DBU), and continuously stirred at 40° C. for 22 h; after the reaction is completed, the solution is added with 20 mL of water and 20 mL of dichloromethane, fully mixed, and allowed to stand for layer separation; then the lower organic phase is taken, washed with 30 mL of 10% (v/v) hydrochloric acid, water, and saturated sodium bicarbonate solution respectively three times for each, and dried over anhydrous sodium sulfate overnight; after centrifugation, the upper oil product is transferred to a 50 mL round bottom flask, and subjected to rotary evaporation at 40° C. under reduced pressure to remove dichloromethane and other solvents, so as to obtain a crude product of yellowish solid.

In the prior art, silica gel column chromatography is used for purification, and an eluent slowly increases its polarity from petroleum ether:ethyl acetate=32:1 (v/v) to petroleum ether:ethyl acetate=16:1 (v/v); this method has the drawbacks of low yield (about 60%) and low purity (80% detected by HPLC).

A high-performance counter-current chromatography method and a preparative liquid chromatography method are used in the present disclosure for purification, and can effectively solve the above problems. In the methods, the high-performance counter-current chromatography method selects a solvent system of n-hexane, ethyl acetate, methanol and water for separation of mixture, the upper phase is a HSCCC mobile phase, and the lower phase is a stationary phase; after experiments with different solvent ratios, it is selected that n-hexane:ethyl acetate:methanol:water=1:0.2:1:0.2 (a volume ratio), a mobile phase flow rate is 2 mL/min, a rotational speed is 800 r/min, a loading volume is 10 mL, a loading mass concentration is 20 mg/mL, and a detection wavelength is 254 nm; a yield is 70%, and a purity is 95% detected by HPLC.

The preparative liquid chromatography method selects a mobile phase of a mixture of water and acetonitrile with a volume ratio of 40:60, a detection wavelength of 254 nm, and a flow rate of 16 mL/min; a yield is 72%, and a purity is 97% detected by HPLC.

Graphene is a two-dimensional planar carbon material resulting from $sp^2$ hybridization, which has large specific surface area, high mechanical strength, and excellent electrical and thermal conductivity. Therefore, graphene can be used as a good carrier to prepare molecularly imprinted materials. For a molecularly imprinted polymer with graphene as a carrier, the molecularly imprinted film is formed on the surface of graphene sheet, which also has a very large specific surface area, and the layer is relatively thin, which is conducive to reducing the "embedding" phenomenon, and the imprinting process taken place on the graphene surface is also conducive to removing and recognizing template molecules; graphene has good electrical conductivity, and a molecularly imprinted electrochemical sensor with graphene as a carrier can achieve high sensitivity and low detection limit; the good thermal property and mechanical property of graphene can improve the stability and reproducibility of molecularly imprinted film.

An embodiment in the present disclosure has the following benefits:

the zearalenone functionalized graphene surface molecularly imprinted material provided in the present disclosure, which has RGO as a carrier, CDHB as a template molecule, 1-ALPP as a functional monomer, TRIM as a cross-linking agent, AIBN as an initiator, and acetonitrile as a pore-forming agent, exhibits high adsorption capacity and good selectivity for ZEN which is showed by the static and selective adsorption experiment, can be used for the separation and purification of ZEN, and has broad application prospects.

According to a third aspect of an embodiment in the present disclosure, the embodiment in the present disclosure provides use of the zearalenone functionalized graphene surface molecularly imprinted material in preparing a ZEN molecularly imprinted solid-phase extraction small column; in an embodiment, a preparation method for the zearalenone functionalized graphene surface molecularly imprinted material includes the following steps:

(1) adding RGO, CDHB, 1-ALPP, TRIM, AIBN and acetonitrile into a solvent in sequence, mixing them uniformly, injecting nitrogen to remove oxygen followed by sealing, and subjecting the mixture to ultraviolet light irradiation for 24 h or 60° C. water bath for constant-temperature reaction for 24 h, so as to obtain a functionalized graphene surface molecularly imprinted polymer; and (2) grinding the functionalized graphene surface molecularly imprinted polymer and sieving it through a 100-200 mesh screen, subjecting the product to soak or reflux with a mixture of methanol/acetic acid=96/4 (v/v) until CDHB is removed completely, drying the product at 40° C. overnight, so as to obtain the zearalenone functionalized graphene surface molecularly imprinted material.

In another embodiment, a preparation method for the zearalenone functionalized graphene surface molecularly imprinted material includes the following steps:

(1) adding CDHB, 1-ALPP, TRIM, AIBN and acetonitrile into a solvent in sequence, mixing them uniformly, injecting nitrogen to remove oxygen followed by sealing, and subjecting the mixture to ultraviolet light irradiation for 24 h or 60° C. water bath for constant-temperature reaction for 24 h, so as to obtain a molecularly imprinted polymer;

(2) grinding the molecularly imprinted polymer and sieving it through a 100-200 mesh screen, subjecting the product to soak or reflux with a mixture of methanol/acetic acid=96/4 (v/v) until CDHB is removed completely, drying the product at 40° C. overnight, so as to obtain a template-removed molecularly imprinted polymer; and (3) dispersing GO into water or DMF, adding the template-removed molecularly imprinted polymer, subjecting the mixture to ultrasound and mixing it uniformly, then adding hydrazine hydrate, heating the obtained mixture in a 90-95° C. water bath for 4-6 h, cooling the mixture to room temperature, filtering the same to obtain powder, then washing the powder with water and ethanol for a plurality of times in sequence, and drying the product at 60° C. for 1-2 h, so as to obtain the zearalenone functionalized graphene surface molecularly imprinted material.

Furthermore, an addition amount of the GO is 0.1-0.5% weight of the template-removed molecularly imprinted polymer, a concentration of the hydrazine hydrate is 1-10%, and an addition volume to weight ratio of hydrazine hydrate and GO is 1-2 μL:1 mg.

Furthermore, a preparation method for the ZEN molecularly imprinted solid-phase extraction small column includes the following steps:

using the zearalenone functionalized graphene surface molecularly imprinted material as a filler and acetonitrile as a homogenate agent, packing them into a solid-phase extraction empty column by a wet method, adding a mesh piece at the top of the column, and pressing the mesh piece lightly to make the filler compact, so as to obtain the ZEN molecularly imprinted solid-phase extraction small column.

According to a fourth aspect of an embodiment in the present disclosure, the embodiment in the present disclosure provides use of the zearalenone functionalized graphene surface molecularly imprinted material in preparing a ZEN-specifically-entrapping mesh, in which a preparation method for the ZEN-specifically-entrapping mesh includes the following steps:

(1) pretreatment: subjecting a stainless steel metal mesh with a pore size of 50-200 mesh to ultrasonic cleaning in acetone, deionized water and ethanol for 15-30 min in sequence, drying the mesh in an oven at 60° C., then soaking the mesh in a diluted acid solution with a concentration of 5-10% for 1-2 h, taking the mesh out and then rinsing it with deionized water for a plurality of times, and drying the mesh in an oven at 60-80° C.;

(2) preparation of a graphene molecularly imprinted material film-forming solution: subjecting RGO to ultrasound and dissolving it in DMF, then adding CDHB, 1-ALPP, TRIM, AIBN and acetonitrile in sequence, mixing those substances uniformly, and injecting nitrogen to remove oxygen for later use; and (3) soaking the stainless steel metal mesh treated by step (1) in the film-forming solution of step (2) for 5 min and then pulling it out at a speed of 2 mm/s, and repeating the operation continuously for 3-5 times, so as to form a uniform film on the surface of the stainless steel metal mesh, and placing the stainless steel metal mesh in a wide-mouth glass vessel, injecting nitrogen to remove oxygen for 15 min, sealing the vessel mouth, and under $N_2$ protection, subjecting the mesh to constant-temperature reaction at 60-65° C. for 4-12 h, cooling the mesh to room temperature, then subjecting the mesh to soak or reflux with a mixture of methanol/acetic acid=96/4 (v/v) until CDHB is removed completely, then soaking and washing the mesh with deionized water and ethanol repeatedly for a plurality of times, and drying the mesh in an oven at 60° C., so as to obtain the ZEN-specifically-entrapping mesh.

According to a fifth aspect of an embodiments in the present disclosure, the embodiment in the present disclosure provides use of the zearalenone functionalized graphene surface molecularly imprinted material in preparing a ZENspecifically-removing molecularly imprinted sphere, in which a preparation method for the ZEN-specifically-removing molecularly imprinted sphere includes the following steps:
(1) preparation of a graphene molecularly imprinted material film-forming solution: firstly subjecting RGO to ultrasound and dissolving it in DMF, then adding CDHB, 1-ALPP, TRIM, AIBN and acetonitrile in sequence, mixing those substances uniformly, and injecting nitrogen to remove oxygen followed by sealing; and
(2) soaking silica spheres with a diameter of 1-10 mm in the film-forming solution of step (1), placing the spheres in a wide-mouth glass vessel, injecting nitrogen to remove oxygen for 15 min, sealing the vessel mouth, and under $N_2$ protection, subjecting the spheres to constant-temperature reaction at 60-65° C. for 4-12 h, cooling the spheres to room temperature, then taking the silica spheres out and subjecting them to soak or reflux with a mixture of methanol/acetic acid=96/4 (v/v) until CDHB is removed completely, soaking and washing the spheres with deionized water and ethanol repeatedly for a plurality of times, and drying the spheres in an oven at 60° C., so as to obtain the ZEN-specifically-removing molecularly imprinted sphere.

In the above embodiment, a molar ratio of the CDHB:1-ALPP:TRIM is 1:4-8:20, an addition amount of AIBN is 10-20% weight of 1-ALPP, a molar amount to volume ratio of CDHB and acetonitrile is 1 mol:10-30 mL, and a mass concentration of RGO is 0.3-0.8 mg/mL.

Furthermore, the solvent is DMF.

An embodiment in the present disclosure has the following benefits:

In view of that the prepared zearalenone functionalized graphene surface molecularly imprinted material has high adsorption capacity and good selectivity for ZEN, the application of the zearalenone functionalized graphene surface molecularly imprinted material provided in the present disclosure lays in the two aspects described below.

In the present disclosure, the material is used as a filler to pack the ZEN molecularly imprinted solid-phase extraction small column. It has the following effects: 1) a complex matrix purification column; and 2) a column that is similar to immunoaffinity column, but has better tolerance than immunoaffinity column (resisting acid and alkali, high temperature, etc.), and lower cost.

In the present disclosure, the material is loaded on a stainless steel metal mesh to give the ZEN-specifically-entrapping mesh. The material is coated on the surface of a silica sphere carrier to give the ZEN-specifically-removing molecularly imprinted sphere with a controllable diameter. The efficient and safe ZEN removal can be achieved by applying the ZEN-specifically-entrapping mesh and the ZEN-specifically-removing molecularly imprinted sphere provided in the present disclosure to the processing of grain and oil, ZEN is easy to collect, and the ZEN-specifically-entrapping mesh and the ZEN-specifically-removing molecularly imprinted sphere can be recycled, improving the economic and social benefits of grain and oil processing plants.

BRIEF DESCRIPTION OF DRAWINGS

In order to illustrate the embodiments in the present disclosure or the technical solutions in the prior art more clearly, the drawings used in the description of the embodiments or the prior art is briefly described below. It should be apparent that the drawings in the following description are merely illustrative, and for those skilled in the art, other drawings of embodiments can be obtained according to the drawings provided without creative efforts.

DETAILED DESCRIPTION

The implementation of the present disclosure is further described below through specific embodiments, and those skilled in the art can easily ascertain other advantages and effects of the present disclosure through the content disclosed by the description; apparently, the embodiments described are merely a part of the embodiments in the present disclosure, and not all of the embodiments. Based on the embodiments in the present disclosure, any embodiment obtained by those skilled in the art without creative efforts shall fall within the protection scope of the present disclosure.

For those without specific technique or condition indicated, the embodiments are performed according to the technique or condition described in the literature in the field, or according to the product specification. For those without manufacturer indicated, the reagents or instruments are all conventional products that can be commercially purchased through regular channels.

Example 1

This example provides a preparation method for the zearalenone functionalized graphene surface molecularly imprinted material, including the following steps:
20.0 mg of RGO was dispersed into 20 mL of DMF under ultrasound, 4.0 mg of N-vinylcarbazole was added into the same, the mixture was subjected to ultrasound for 2 h and mixed uniformly, then 320.0 mg of CDHB, 504.8 mg of 1-ALPP and 10 mL of acetonitrile were added, and after the mixture was allowed to stand for 15 min, 5.9264 g of TRIM and 77.2 mg of AIBN were added, and after the system was mixed uniformly, nitrogen was injected for 30 min, and the sealed reaction vessel was placed under ultraviolet light ($\lambda$=254 nm) irradiation for 24 h, so as to obtain a functionalized graphene surface molecularly imprinted polymer (being gray-black and hard); and the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain the zearalenone functionalized graphene surface molecularly imprinted material.

Example 2

This example provides a preparation method for the zearalenone functionalized graphene surface molecularly imprinted material, including the following steps:
20.0 mg of RGO was dispersed into 20 mL of DMF under ultrasound, 4.0 mg of N-vinylcarbazole was added into the same, the mixture was subjected to ultrasound for 2 h and mixed uniformly, then 320.0 mg of CDHB, 757.2 mg of 1-ALPP and 10 mL of acetonitrile were added, and after the mixture was allowed to stand for 15 min, 5.9264 g of TRIM and 77.2 mg of AIBN were added, and after the system was mixed uniformly, nitrogen was injected for 30 min, and the sealed reaction vessel was placed in 60° C. water bath for constant-temperature reaction for 24 h, so as to obtain a functionalized graphene surface molecularly imprinted polymer (being gray-black and hard); and the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain the zearalenone functionalized graphene surface molecularly imprinted material.

Example 3

This example provides a preparation method for the zearalenone functionalized graphene surface molecularly imprinted material, including the following steps:
320.0 mg of CDHB, 504.8 mg of 1-ALPP and 10 mL of acetonitrile were added into 20 mL DMF in sequence, and after the mixture was allowed to stand for 15 min, 5.9264 g of TRIM and 77.2 mg of AIBN were added, and after the system was mixed uniformly, nitrogen was injected for 30 min, and the sealed reaction vessel was placed under ultraviolet light ($\lambda$=254 nm) irradiation for 24 h, so as to obtain a molecularly imprinted polymer (being gray-black and hard);
the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain a template-removed molecularly imprinted polymer; and
50 mg of the template-removed molecularly imprinted polymer and 0.15 mg of GO were added into 50 mL of water, subjected to ultrasound for 1 h and mixed uniformly, added with 20 μL of 1% hydrazine hydrate, heated in a water bath at 95° C. for 4 h, cooled to room temperature, and filtered to obtain powder, and then the powder was washed by water and ethanol in sequence for a plurality of times, dried in an oven at 60° C. for 2 h, so as to obtain the zearalenone functionalized graphene surface molecularly imprinted material.

Example 4

This example provides a preparation method for the zearalenone functionalized graphene surface molecularly imprinted material, including the following steps:
320.0 mg of CDHB, 1009.6 mg of 1-ALPP and 10 mL of acetonitrile were added into 20 mL DMF in sequence, and after the mixture was allowed to stand for 15 min, 5.9264 g of TRIM and 77.2 mg of AIBN were added, and after the system was mixed uniformly, nitrogen was injected for 30 min, and the sealed reaction vessel was placed in 60° C. water bath for constant-temperature reaction for 24 h, so as to obtain a molecularly imprinted polymer (being gray-black and hard);
the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain a template-removed molecularly imprinted polymer; and
50 mg of the template-removed molecularly imprinted polymer and 0.15 mg of GO were added into 50 mL of DMF, subjected to ultrasound for 1 h and mixed uniformly, added with 20 μL of 1% hydrazine hydrate, heated in a water bath at 95° C. for 6 h, cooled to room temperature, and filtered to obtain powder, and then the powder was washed by water and ethanol in sequence for a plurality of times, dried in an oven at 60° C. for 2 h, so as to obtain the zearalenone functionalized graphene surface molecularly imprinted material.

Example 5

The preparation method for the zearalenone functionalized graphene surface molecularly imprinted material provided in this example differs from Example 3 only in that: an addition amount of GO was 0.05 mg.

Example 6

The preparation method for the zearalenone functionalized graphene surface molecularly imprinted material provided in this example differs from Example 3 only in that: an addition amount of GO was 0.25 mg.

Comparative Example 1

The preparation method for the zearalenone functionalized graphene surface molecularly imprinted material provided in this comparative example differs from Example 3 only in that: 20 μL of 1% hydrazine hydrate was replaced with 6.25 mg ascorbic acid.

Comparative Example 2

The preparation method for the zearalenone functionalized graphene surface molecularly imprinted material provided in this example differs from Example 3 only in that: the reducing agent of hydrazine hydrate was not added.

Test Example 1

Test for ZEN adsorption capacity of the zearalenone functionalized graphene surface molecularly imprinted materials prepared in Examples 1-6 and Comparative Examples 1-2.

Eight samples of 0.5 ppm ZEN acetonitrile solution of 5 mL were taken, added with the above materials of the same amount respectively, subjected to ultrasound and stirred until reaching adsorption equilibrium, and then the effect of different modification methods on the adsorption capacity were investigated.

The adsorption capacity was evaluated by the adsorption rate (Q): $Q=(C_0-C_t)/C_0*100\%$, in which $C_0$ and $C_t$ represented the initial concentration and the adsorption equilibrium concentration of ZEN ($mg \cdot L^{-1}$), respectively. The results are shown in Table 1.

TABLE 1

| Adsorption rate of the sample | Addition amount of the molecularly imprinted material/mg | | | | |
|---|---|---|---|---|---|
| | 1 mg | 3 mg | 5 mg | 10 mg | 15 mg |
| Example 1 | 21% | 33% | 68% | 92% | 95% |
| Example 2 | 15% | 30% | 54% | 88% | 90% |
| Example 3 | 23% | 46% | 78% | 97% | 100% |
| Example 4 | 13% | 26% | 49% | 71% | 83% |
| Example 5 | 20% | 41% | 70% | 89% | 93% |
| Example 6 | 18% | 37% | 65% | 78% | 88% |
| Comparative Example 1 | 10% | 21% | 34% | 58% | 62% |
| Comparative Example 2 | 24% | 45% | 73% | 95% | 97% |

The results show that: with the increase of RGO content, the adsorption capacity of RGO-MIP would increase, and when the RGO content was 0.3%, the adsorption effect of the obtained RGO-MIP was the best, and with the continuous increase of RGO ratio, the adsorption capacity would decrease instead. Because the surface malleability of RGO will increase the contact area between MIP and target molecules, the adsorption capacity increases with the increase of RGO content, but when the content of RGO is too high, RGO will cover the specific binding sites on the MIP surface, turn to affect it specifically binding to the target molecules; thereby the optimal ratio of RGO was 0.3%.

The ascorbic acid used in Comparative Example 1 has a weak reducing effect and cannot completely reduce GO, which will affect the adsorption effect; meanwhile, since there may be residual ascorbic acid on the material surface, its hydroxyl group will also inhibit the ZEN adsorption of the material.

GO has the similar circumstance with RGO; the surface malleability of GO will increase the contact area between MIP and target molecules, allowing more binding sites to be exposed, and meanwhile, the groups on GO surface, such as carboxyl and hydroxyl groups, may also bind to target molecules through hydrogen bonds or electrostatic interactions; hence, under the condition that there only existed the target molecule (ZEN), Comparative Example 2 also showed a good adsorption effect.

Test Example 2

Test for ZEN specific adsorption capacity of the zearalenone functionalized graphene surface molecularly imprinted materials prepared in Examples 1 and 3 and Comparative Example 2.

A mixture solution of ZEN and deoxynivalenol (DON) with a certain concentration (containing 0.5 ppm of each one) was prepared, and added with GO-MIP and RGO-MIP of the same amount (10 mg), respectively. The adsorption capacity was evaluated by the adsorption rate (Q): $Q=(C_0-C_t)/C_0*100\%$, in which $C_0$ and $C_t$ represented the initial concentration and the adsorption equilibrium concentration of ZEN ($mg \cdot L^{-1}$), respectively. The results are shown in Table 2.

TABLE 2

| | | Adsorption time | | | |
|---|---|---|---|---|---|
| Sample | Substance | 0 min | 10 min | 15 min | 30 min |
| Example 1 | ZEN | 0 | 51% | 85% | 92% |
| | DON | 0 | 4% | 4% | 5% |
| Example 3 | ZEN | 0 | 55% | 92% | 97% |
| | DON | 0 | 2% | 2% | 2% |
| Comparative Example 2 | ZEN | 0 | 46% | 77% | 84% |
| | DON | 0 | 33% | 38% | 40% |

The results show that: the molecularly imprinted material in Comparative Example 2 had a weak specific adsorption capacity for ZEN, indicating that the zearalenone functionalized graphene surface molecularly imprinted material provided in the present disclosure had a strong specific adsorption capacity for ZEN.

GO has oxygen-containing functional groups on its surface, and is prone to adsorb ZEN, DON and other compounds with hydroxyl functional groups indistinguishably, and after GO is reduced to RGO, its oxygen-containing functional groups will decrease or disappear, and the adsorption effect mainly comes from the molecularly imprinted material, thereby improving the specific adsorption capacity for ZEN.

Test Example 3

Figure 1:
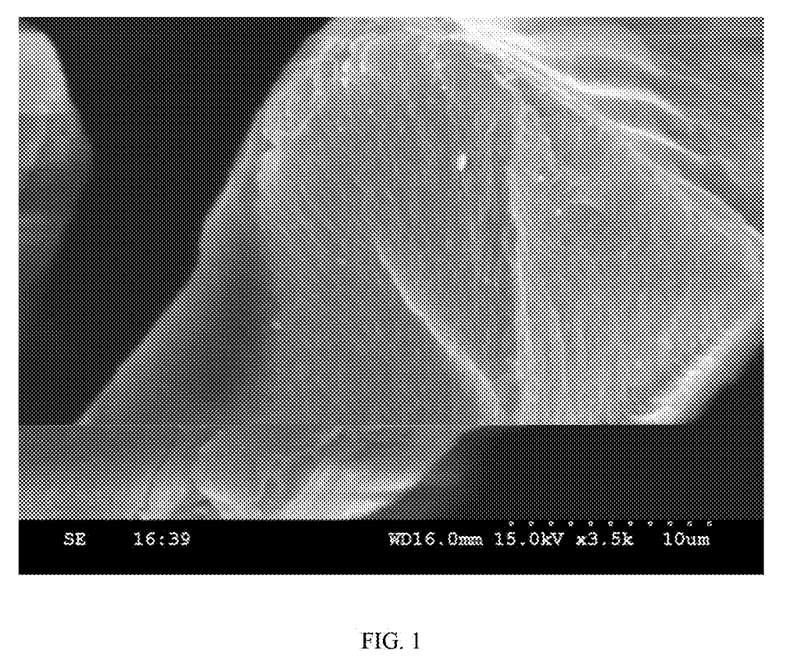
FIG. 1 is an image from scanning electron microscope (SEM) showing the template-removed molecularly imprinted polymer (denoted as MIP) prepared in the second step of Example 3.
Figure 2:
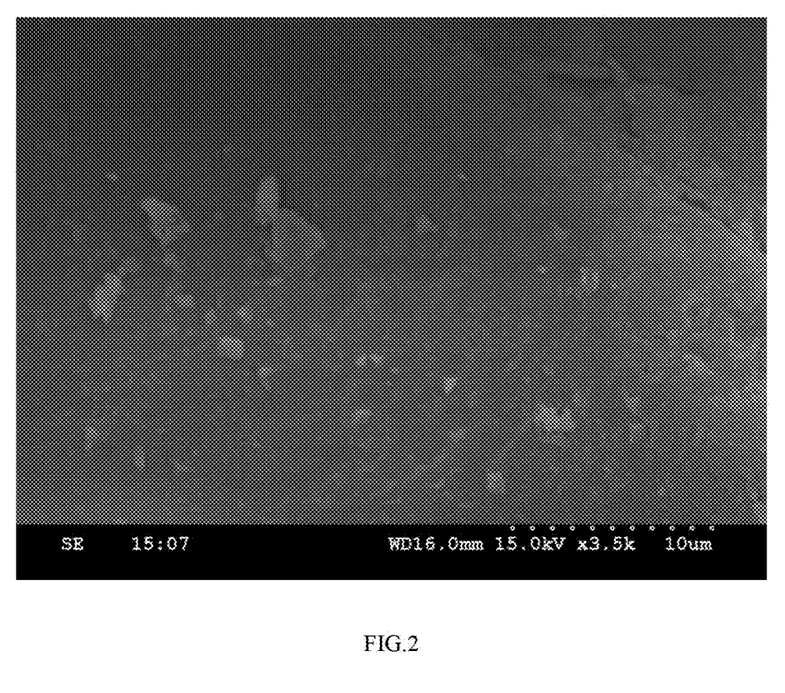
FIG. 2 is an image from scanning electron microscope (SEM) showing the zearalenone functionalized graphene surface molecularly imprinted material (denoted as RGO-MIP) prepared in Example 3.
Figure 3:
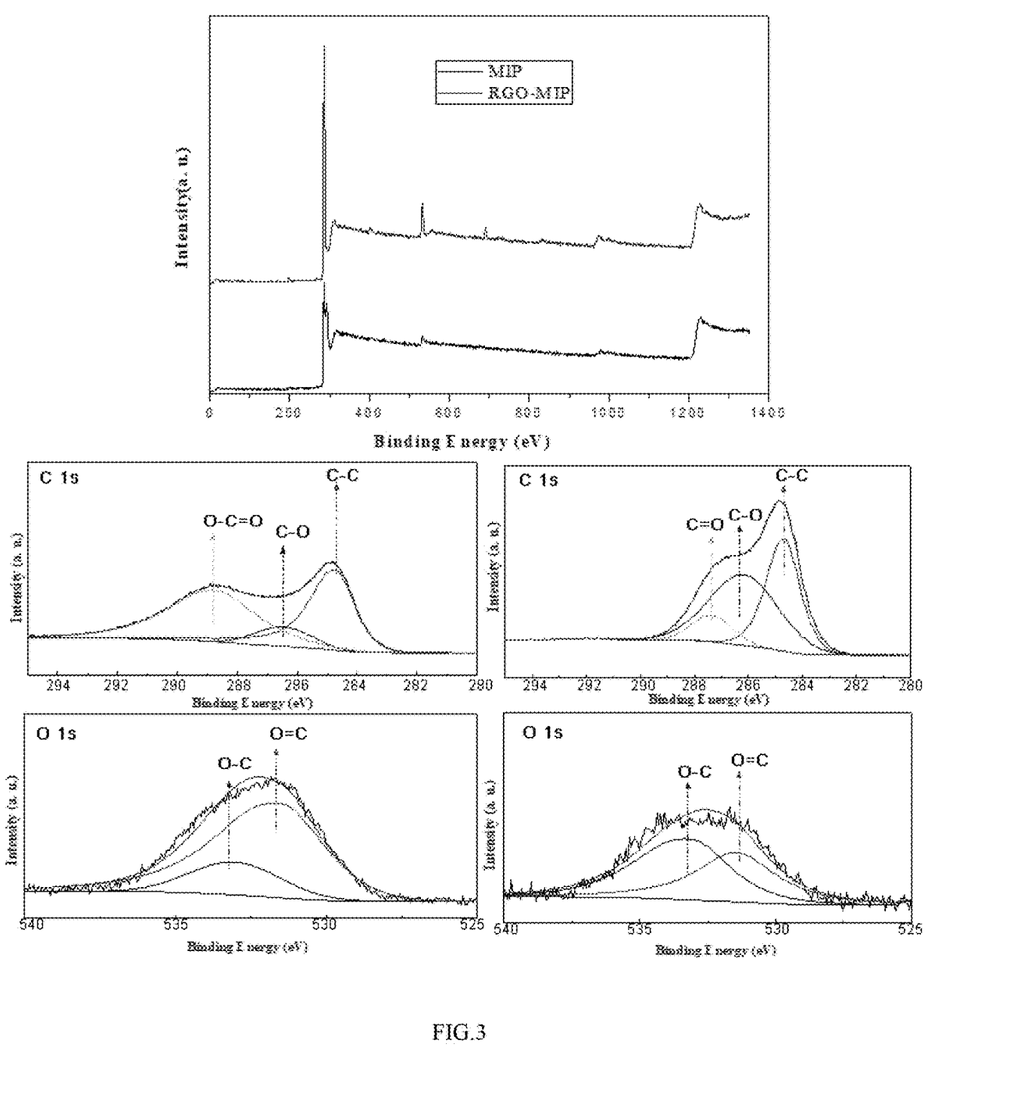
FIG. 3 is X-ray photoelectron spectra (X-ray photoelectron spectroscopy, XPS) of MIP and RGO-MIP, in which the C/O ratio of RGO-MIP was higher than MIP, indicating that the functionalized graphene did exist in RGO-MIP. Compared with MIP, RGO-MIP had the appearance of C=O and the increase of C—C, C—O (epoxy group) and C—OH, indicating that the functionalized graphene was successfully introduced on MIP, and under the reduction effect of hydrazine hydrate, O—C=O disappeared, and GO was reduced to RGO.

A ZEN solution with a certain concentration was prepared, and 10 mg of the zearalenone functionalized graphene surface molecularly imprinted material prepared in Example 3 (denoted as RGO-MIP) (see FIG. 2 for SEM), the template-removed molecularly imprinted polymer prepared in the second step of Example 3 (denoted as MIP) (see FIG. 1 for SEM) and NIP (namely, the blank control without CDHB added during preparation) were added to 100 mL of ZEN solution (0.5 ppm), respectively, and subjected to ultrasound and stirred for absorption for 5 h. Samples were taken every 1 h and loaded in a liquid chromatography for detection. The adsorption capacity ($q_e$) of the polymer for ZEN was calculated. The $q_e$ was calculated according to the following formula:

$$q_e=(C_0-C_t)V/m$$

in which $C_0$ and $C_t$ represented the initial concentration of ZEN ($mg \cdot L^{-1}$) and the adsorption equilibrium concentration of ZEN ($mg \cdot L^{-1}$) at a certain moment, respectively, V represented the solution volume (L), and m represented the mass of the adsorbent (g).

Figure 4:
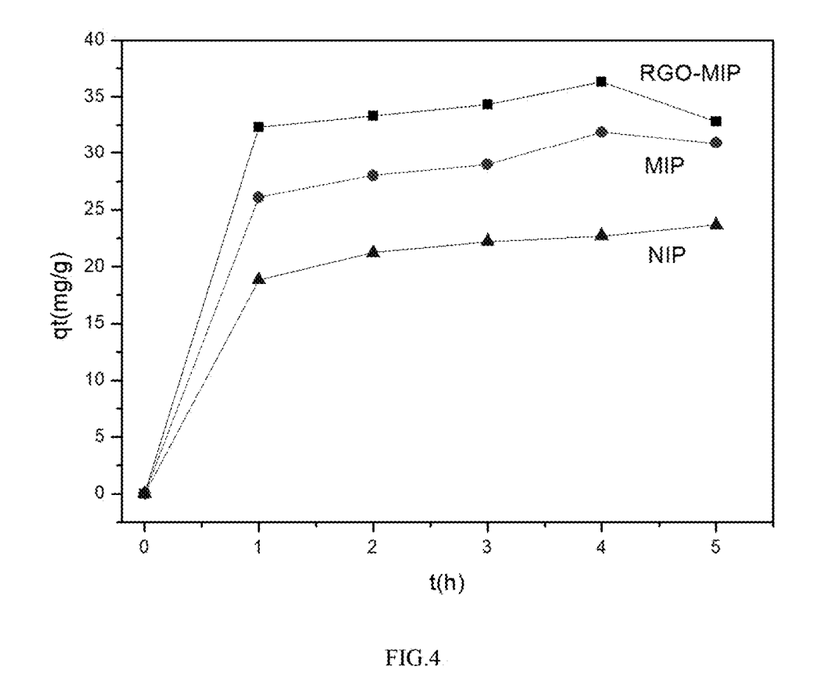
FIG. 4 shows the comparison among ZEN adsorption performance of three polymers at different adsorption time.

FIG. 4 shows the comparison among ZEN adsorption performance of three polymers at different adsorption time.

Figure 5:
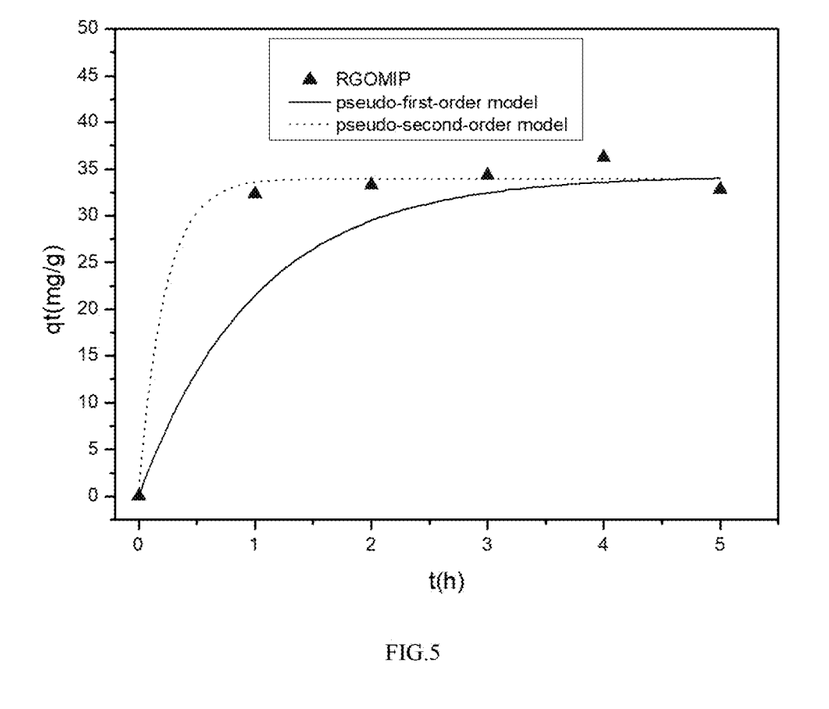
FIG. 5 shows the adsorption kinetic model of the zearalenone functionalized graphene surface molecularly imprinted material provided by an embodiment in the present disclosure.

To further investigate the adsorption mechanism of the zearalenone functionalized graphene surface molecularly imprinted material of embodiments in the present disclosure, the pseudo-first-order and pseudo-second-order models were used for fitting, respectively. As can be seen from FIG. 5, the pseudo-second-order kinetic model was more suitable for the adoption kinetics.

As shown in the results, the adsorption performances of RGO-MIP and MIP were both better than NIP. According to the formation principle of molecularly imprinted polymer, it can be inferred that after CDHB is added, CDHB and the functional monomers are combined under hydrogen bonds, and then form the polymer with the help of ultraviolet light under the effect of the cross-linking agent and the initiator. When CDHB is removed from the polymer by being dissolved in the solution, the polymer surface will form hole sites with similar structure to ZEN, so that ZEN can effectively bind to the holes on polymer surface. The adsorption performance of RGO-MIP was better than MIP, indicating that the introduced graphene exerted some effects.

According to the network structure of graphene, when CDHB are mixed with graphene solution, CDHB is introduced on the graphene substrate, binds to functional monomers under hydrogen bonds at the same time, and further forms the polymer on the graphene surface. This structure allows the polymer to stretch more fully on the carrier surface, and after the template is removed, more hole sites are thus exposed, so that under the same conditions, RGO-MIP could adsorb more ZEN molecules.

Example 7

This example provides a preparation method for a filler of a ZEN molecularly imprinted solid-phase extraction small column, including the following steps:

20.0 mg of RGO was dispersed into 20 mL of DMF under ultrasound, 4.0 mg of N-vinylcarbazole was added into the same, the mixture was subjected to ultrasound for 2 h and mixed uniformly, then 320.0 mg of CDHB, 504.8 mg of 1-ALPP and 10 mL of acetonitrile were added, and after the mixture was allowed to stand for 15 min, 5.9264 g of TRIM and 77.2 mg of AIBN were added, and after the system was mixed uniformly, nitrogen was injected for 30 min, and the sealed reaction vessel was placed under ultraviolet light ($\lambda$=254 nm) irradiation for 24 h, so as to obtain a functionalized graphene surface molecularly imprinted polymer (being gray-black and hard); and the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain a zearalenone functionalized graphene surface molecularly imprinted material.

Preparation and performance evaluation of the ZEN molecularly imprinted solid-phase extraction small column 50 mg of the zearalenone functionalized graphene surface molecularly imprinted material prepared in this example was accurately weighted out, and packed into a solid-phase extraction small column by a wet method, and then both ends of the column were capped by mesh pieces of polytetrafluoroethylene. Before use, the column was activated with 10 mL of methanol, and then washed with 10 mL of deionized water. 3 mL extraction solution (the ZEN concentration was 0.5 mg/L) of ZEN-containing sample was transferred to the above activated solid-phase extraction small column, and the flow rate was controlled at 1 drop/s. After the sample was drained, 10 mL of methanol/water (5/95, V/V) mixture was added for washing, and the washing liquid was discarded. The small column was drained, and then 10 mL of methanol was added to elute. All the eluents were collected, dried by nitrogen blowing, then dissolved by 2 mL methanol and brought to a certain volume, and after the solution was filtered with a 0.22 μm filter, it was loaded in a high performance liquid chromatography for detection.

The results show that: the ZEN molecularly imprinted solid-phase extraction small column provided in this example had a recovery rate reaching 100% for ZEN, and had a significant purification effect for the complex matrix.

Example 8

This example provides a preparation method for a filler of a ZEN molecularly imprinted solid-phase extraction small column, including the following steps:

320.0 mg of CDHB, 504.8 mg of 1-ALPP and 10 mL of acetonitrile were added into 20 mL DMF in sequence, and after the mixture was allowed to stand for 15 min, 5.9264 g of TRIM and 77.2 mg of AIBN were added, and after the system was mixed uniformly, nitrogen was injected for 30 min, and the sealed reaction vessel was placed under ultraviolet light ($\lambda$=254 nm) irradiation for 24 h, so as to obtain a molecularly imprinted polymer (being gray-black and hard);

the obtained polymer was ground in a mortar and sieved through a 200 mesh screen, and with a mixture of methanol/acetic acid=96/4 (v/v) as an eluent, the polymer was subjected to reflux for a plurality of times to remove CDHB, and then placed in an oven and dried at 40° C. overnight, so as to obtain a template-removed molecularly imprinted polymer; and 50 mg of the template-removed molecularly imprinted polymer and 0.15 mg of GO were added into 50 mL of water, subjected to ultrasound for 1 h and mixed uniformly, added with 20 μL of 1% hydrazine hydrate, heated in a water bath at 95° C. for 4 h, cooled to room temperature, and filtered to obtain powder, and then the powder was washed by water and ethanol in sequence for a plurality of times, dried in an oven at 60° C. for 2 h, so as to obtain a zearalenone functionalized graphene surface molecularly imprinted material.

The ZEN molecularly imprinted solid-phase extraction small column was prepared using the same method provided in Example 7 and evaluated on its performance. The results show that: the ZEN molecularly imprinted solid-phase extraction small column provided in this example had a recovery rate reaching 100% for ZEN, and had a significant purification effect for the complex matrix.

Example 9

This example provides a preparation method for a ZEN-specifically-entrapping mesh, including the following steps:

(1) pretreatment: a stainless steel metal mesh with a pore size of 100 mesh was subjected to ultrasonic cleaning in acetone, deionized water and ethanol for 20 min in sequence, dried in an oven at 60° C., then soaked in a diluted chlorhydric acid solution with a concentration of 5% for 2 h, taken out and then rinsed with deionized water for a plurality of times, and dried in an oven at 60° C.;

(2) preparation of a graphene molecularly imprinted material film-forming solution: 20.0 mg of RGO was dissolved completely into 20 mL of DMF under ultrasound, and then 320.0 mg of CDHB, 504.8 mg of 1-ALPP, 5.9264 g of TRIM, 77.2 mg of AIBN and 10 mL acetonitrile were added in sequence, and stirred under $N_2$ atmosphere for 30 min until being dissolved completely, so as to obtain the film-forming solution for later use; and (3) the stainless steel metal mesh treated by step (1) was soaked in the film-forming solution of step (2) for 5 min and then pulled out at a speed of 2 mm/s, the operation was repeated continuously for 5 times, so as to form a uniform film on the surface of the stainless steel metal mesh, the stainless steel metal mesh was placed in a wide-mouth glass vessel, nitrogen was injected to remove oxygen for 15 min, the vessel mouth was sealed, and under $N_2$ protection, the mesh was subjected to constant-temperature reaction at 65° C. for 8 h, cooled to room temperature, then subjected to reflux with a mixture of methanol/acetic acid=96/4 (v/v) until CDHB was removed completely, then soaked and washed with deionized water and ethanol repeatedly for a plurality of times, and dried in an oven at 60° C., so as to obtain the ZEN-specifically-entrapping mesh.

Performance evaluation of the ZEN-specifically-entrapping mesh

The ZEN-specifically-entrapping mesh prepared in this example was packed in the head part of the solvent filter, and 100 mL of ZEN-containing liquid sample (the ZEN concentration was 0.5 mg/L) was led to flowing through the mesh, controlling the flow rate to guarantee that all the sample flowed through using about 15 min. The ZEN content of the solution was detected after passing through the mesh.

The removal rate was represented by F: $F=(C_0-C_t)/C_0*100\%$, in which CO and $C_t$ represented the concentration of ZEN in the sample (mg·L$^{-1}$) before and after passing through the mesh, respectively.

The results show that: the ZEN-specifically-entrapping mesh provided in this example had a removal rate reaching 100% for ZEN in the sample solution.

Example 10

This example provides a preparation method for a ZEN-specifically-removing molecularly imprinted sphere, including the following steps:
(1) preparation of a graphene molecularly imprinted material film-forming solution: 20.0 mg of RGO was dissolved completely into 20 mL of DMF under ultrasound, and then 320.0 mg of CDHB, 504.8 mg of 1-ALPP, 5.9264 g of TRIM, 77.2 mg of AIBN and 10 mL acetonitrile were added into the solvent in sequence, and mixed uniformly, and nitrogen was injected to remove oxygen followed by sealing; and
(2) silica spheres with a diameter of 5 mm were soaked in the film-forming solution of step (1), and placed in a wide-mouth glass vessel, and nitrogen was injected to remove oxygen for 15 min, the vessel mouth was sealed, and under $N_2$ protection, the silica spheres was subjected to constant-temperature reaction at 60° C. for 8 h, cooled to room temperature, then taken out, removed the extra polymer attached on the surface, then subjected to reflux with a mixture of methanol/acetic acid=96/4 (v/v) until the template molecules were removed completely, soaked and washed with deionized water and ethanol repeatedly for a plurality of times, and dried in an oven at 60° C., so as to obtain the ZEN-specifically-removing molecularly imprinted sphere.

Performance evaluation of the ZEN-specifically-removing molecularly imprinted sphere Fifty ZEN-specifically-removing molecularly imprinted spheres prepared above were taken and put into a liquid sample of 100 mL containing ZEN (the ZEN concentration was 0.5 mg/L), stirred and blended for 15 min, and the imprinted spheres were filtered out, and the ZEN content of the filtrate was detected.

The adsorption capacity of the specifically molecularly imprinted sphere was evaluated by the adsorption rate (Q): $Q=(C_0-C_t)/C_0*100\%$, in which $C_0$ and $C_t$ represented the concentration of ZEN in the sample (mg·L$^{-1}$) before and after put the imprinted spheres, respectively.

The results show that: the ZEN-specifically-removing molecularly imprinted sphere provided in this example had a adsorption capacity reaching 99% for ZEN in the sample solution.

Although general description and specific embodiments have been used hereinabove to describe the present disclosure in detail, modifications or improvements can be made for those above based on the present disclosure, which is apparent to those skilled in the art. Therefore, those modifications or improvements without departing from the spirit of the present disclosure all fall within the protection scope of the present disclosure.

The invention claimed is:

1. A zearalenone functionalized graphene surface molecularly imprinted material, which has reduced graphene oxide (RGO) as a carrier, cyclododecyl 2,4-dihydroxybenzoate (CDHB) as a template molecule, 1-allylpiperazine (1-ALPP) as a functional monomer, trimethylolpropane triacrylate (TRIM) as a cross-linking agent, azodiisobutyronitrile (AIBN) as an initiator, and acetonitrile as a pore-forming agent;
wherein the zearalenone functionalized graphene surface molecularly imprinted material is prepared by a preparation method comprising the following steps:
adding CDHB, 1-ALPP, TRIM, AIBN and acetonitrile to a solvent in sequence to provide a first mixture, mixing the first mixture uniformly, injecting nitrogen to remove oxygen and sealing the first mixture, and subjecting the first mixture to ultraviolet light irradiation for 24 h or 60° C. water bath for constant-temperature reaction for 24 h to obtain a molecularly imprinted polymer, wherein the solvent is N,N-dimethylformamide (DMF);
grinding the molecularly imprinted polymer, sieving it through a 100-200 mesh screen, and removing CDHB with an eluent to provide a product, drying the product at 40° C. overnight, to obtain a template-removed molecularly imprinted polymer; and
dispersing graphene oxide (GO) into water or DMF, adding the template-removed molecularly imprinted polymer to provide a second mixture, subjecting the second mixture to ultrasound and mixing it uniformly, then adding hydrazine hydrate to provide a third mixture, heating the third mixture in a 90-95° C. water bath for 4-6 h, cooling the third mixture to room temperature, filtering the third mixture to obtain a powder, then washing the powder with water and ethanol in sequence for a plurality of times, and drying the powder at 60° C. for 1-2 h to obtain the zearalenone functionalized graphene surface molecularly imprinted material.

2. The zearalenone functionalized graphene surface molecularly imprinted material according to claim 1, wherein a molar ratio of CDHB:1-ALPP:TRIM is 1:4-8:20, an addition amount of AIBN is 10-20% weight of 1-ALPP, and a molar amount to volume ratio of CDHB and acetonitrile is 1 mol:10-30 mL.

3. The zearalenone functionalized graphene surface molecularly imprinted material according to claim 1, wherein the eluent is a mixture of methanol and acetic acid with a volume ratio of 96:4.

4. The zearalenone functionalized graphene surface molecularly imprinted material according to claim 1, wherein an addition amount of the GO is 0.1-0.5% weight of the template-removed molecularly imprinted polymer, a concentration of the hydrazine hydrate is 1-10%, and an addition volume to weight ratio of hydrazine hydrate and GO is 1-2 µL: 1 mg.

5. The zearalenone functionalized graphene surface molecularly imprinted material according to claim 4, wherein a mass ratio of the GO to the template-removed molecularly imprinted polymer is 0.3%.

6. The zearalenone functionalized graphene surface molecularly imprinted material according to claim 1, wherein a preparation method for the CDHB is prepared by a preparation method that comprises the following steps:

using 2,4-dihydroxybenzoic acid and cyclododecanol as raw materials, N,N'-carbonyldiimidazole (CDI) as an activator, 1,8-diazabicyclo[5.4.0] undec-7-ene (DBU) as a catalyst and DMF as a solvent to provide a reaction mixture, subjecting the reaction mixture to reaction at 40-60° C. for 18-24 h, separating an organic phase, drying the organic phase, and removing the solvent by evaporation under reduced pressure, to obtain a crude product of yellowish solid; and purifying the crude product using a high-performance counter-current chromatography method or a preparative liquid chromatography method, wherein the high-performance counter-current chromatography method selects a mobile phase of a mixture of n-hexane, ethyl acetate, methanol and water with a volume ratio of 1:0.2:1:0.2, a mobile phase flow rate of 2 mL/min, a rotational speed of 800 r/min, a loading volume of 10 mL, a loading mass concentration of 20 mg/mL, and a detection wavelength of 254 nm; the preparative liquid chromatography method selects a mobile phase of a mixture of water and acetonitrile with a volume ratio of 40:60, a detection wavelength of 254 nm, and a flow rate of 16 mL/min.

* * * * *